US007496675B2

(12) United States Patent
Obata et al.

(10) Patent No.: US 7,496,675 B2
(45) Date of Patent: Feb. 24, 2009

(54) DATA MULTIPLEXER, DATA MULTIPLEXING METHOD, AND RECORDING MEDIUM

(75) Inventors: Koji Obata, Tokyo (JP); Noriaki Oishi, Kanagawa (JP); Tomoyuki Sato, Kanagawa (JP); Hajime Nitta, Kanagawa (JP); Kiyoshi Ota, Tokyo (JP)

(73) Assignee: Sony Corporation, Tokyo (JP)

( * ) Notice: Subject to any disclaimer, the term of this patent is extended or adjusted under 35 U.S.C. 154(b) by 914 days.

(21) Appl. No.: 09/824,367

(22) Filed: Apr. 2, 2001

(65) Prior Publication Data

US 2001/0055318 A1    Dec. 27, 2001

(30) Foreign Application Priority Data

Apr. 4, 2000    (JP)    ............................ 2000-102130

(51) Int. Cl.
G06F 15/16 (2006.01)
H06J 3/24 (2006.01)
H06N 7/12 (2006.01)

(52) U.S. Cl. .................. 709/231; 709/201; 709/202; 709/232; 709/233; 709/235; 709/200; 370/474; 348/423

(58) Field of Classification Search .................. 370/110, 370/112, 77, 94.1, 474, 60; 348/423; 709/218, 709/201, 202, 231, 232, 233, 235, 200
See application file for complete search history.

(56) References Cited

U.S. PATENT DOCUMENTS 5,450,409 A * 9/1995 Diaz et al. .................. 370/470
5,452,306 A * 9/1995 Turudic et al. .............. 370/465
5,561,466 A * 10/1996 Kiriyama ................ 375/240.25
5,937,138 A * 8/1999 Fukuda et al. ............... 386/112
5,949,832 A * 9/1999 Liebetreu et al. ............ 375/344
6,307,868 B1 * 10/2001 Rakib et al. ................. 370/485
6,351,471 B1 * 2/2002 Robinett et al. ............. 370/468
6,741,558 B1 * 5/2004 Gresham ..................... 370/230
7,107,513 B1 * 9/2006 Yamauchi .................... 714/795
2008/0247423 A1 * 10/2008 Somashekhar et al. ...... 370/522

OTHER PUBLICATIONS

I. Widjaja, "Conditional Overflow Probability and Profile Curve for ATM Congestion Detection", @1996, IEEE.*
M. Hluchyj, "A Second-Order Leaky Bucket Algorithm to Guarantee QoS in ATM Networks", @1996, IEEE.*

* cited by examiner

*Primary Examiner*—John Follansbee
*Assistant Examiner*—Karen C Tang
(74) *Attorney, Agent, or Firm*—Frommer Lawrence & Haug LLP; William S. Frommer; Thomas F. Presson (57) ABSTRACT

FIG. 3B shows buffer occupancy rate of a transport stream buffer 21 when a TS packet is transferred to the transport stream buffer 21 having a transport rate Rt and a leak rate Rx. A time T1 during which the buffer occupancy rate of the transport stream buffer 21 increases and a time T2 during which the buffer occupancy rate of the transport stream buffer 21 decreases are expressed by $(Rt-Rx) \times T1 = Rx \times T2$ and $T1 = (188 \times 8)/Rt$. A time T is $T = T1 + T2 = (188 \times 8)/Rx$. Therefore, the time T is equal to a time T' shown in FIG. 3C. Thus, when a TS packet is transferred in a cycle of the time T', the transport stream buffer 21 will not overflow and the transport stream buffer 21 becomes empty at least once a second, whereby simulation for the transport stream buffer 21 is not required in the simulation for the T-STD model.

3 Claims, 11 Drawing Sheets

F I G. 1

Related Art

FIG. 2

Related Art

DATA MULTIPLEXER, DATA MULTIPLEXING METHOD, AND RECORDING MEDIUM

BACKGROUND OF THE INVENTION

The present invention relates to a data multiplexer, a data multiplexing method, and a recording medium, and particularly to a data multiplexer, a data multiplexing method, and a recording medium that make it possible to reduce the amount of calculation for simulation of data occupancy rate of a virtual data buffer in a T-STD model, and to thereby readily generate a multiplexed transport stream conforming to the ISO/IEC13818-1 requirements.

When a video stream and an audio stream are multiplexed by an MPEG (Moving Picture Coding Experts Group/Moving Picture Experts Group) transport stream method, which is widely used in broadcasting and AV stream distribution, a multiplexer is required to multiplex the streams in transport packet format in units of 188 bytes so that a decoder for separating and decoding a multiplexed stream can separate and decode each of the streams on the basis of a T-STD (transport Stream System Target Decoder) model, which is a virtual decoder model specified by an MPEG system standard (ISO/IEC13818-1).

Figure 1:
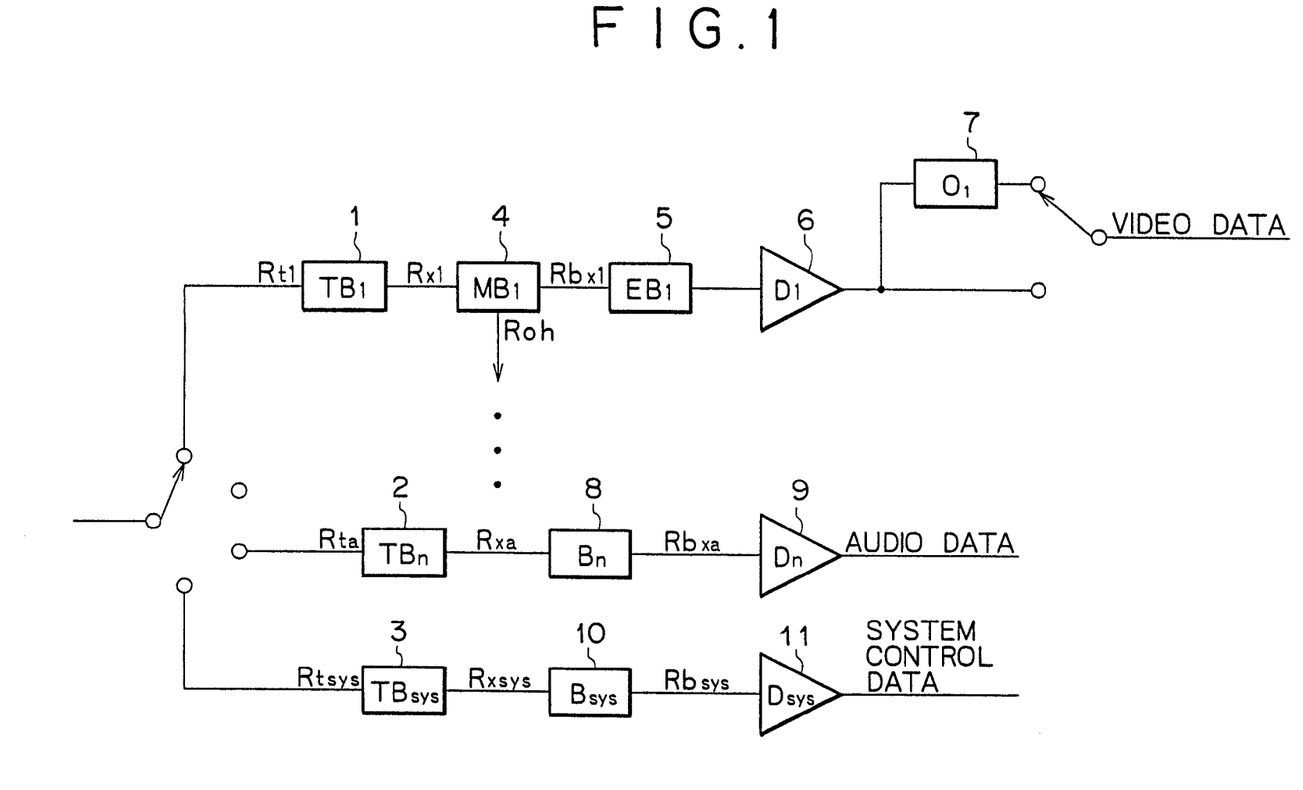
FIG. 1 is a diagram of assistance in explaining a T-STD model.

FIG. 1 shows a T-STD model. The T-STD model is provided with three buffers, that is, a three-stage buffer for a video stream formed by a transport stream buffer, a multiplex buffer, and an elementary stream buffer, a two-stage buffer for an audio stream formed by a transport stream buffer and a main buffer, and a buffer for system control. In the T-STD model, a rate of transfer between the buffers, size of each buffer and the like are defined precisely. While FIG. 1 shows only one video stream buffer, one audio stream buffer, and one system control buffer, the number of video stream buffers and audio stream buffers provided in FIG. 1 coincides with the number of channels of the corresponding elementary streams.

Figure 2:
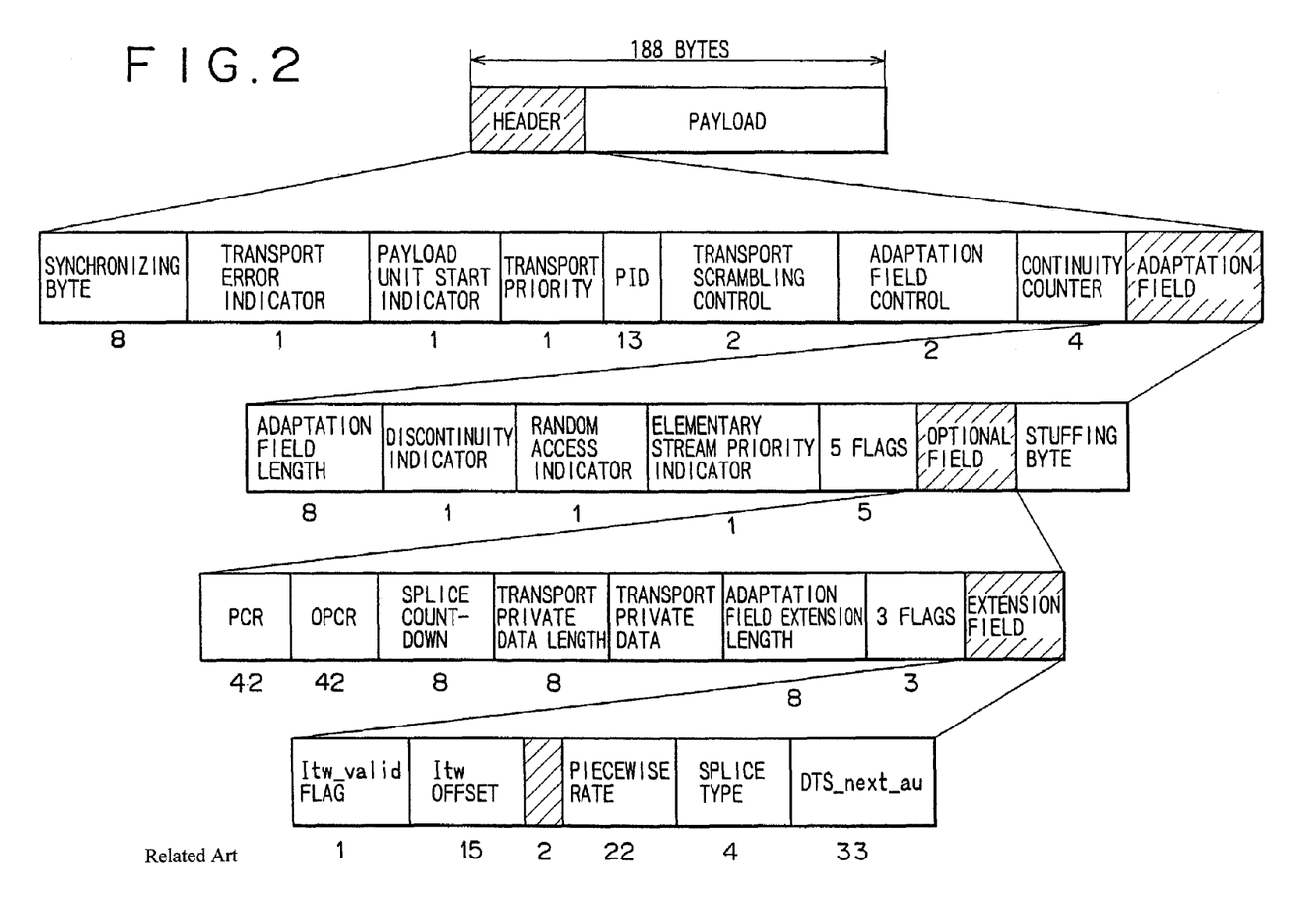
FIG. 2 is a diagram of assistance in explaining a TS packet.

A multiplexed data stream inputted to the T-STD is instantly transferred to one of transport stream buffers TB11 to TBsys3 that corresponds to the data stream, according to whether the data of the multiplexed data stream is video data, audio data, or system control data (the attribute of data described in each packet is described in a PID (Packet Identification), which will be described later with reference to FIG. 2), and then buffered in the corresponding buffer. Size of the transport stream buffers TB11 to TBsys3 is defined as 512 bytes. It is specified that the transport stream buffers TB11 to TBsys3 must not overflow and must be emptied at least once a second.

A video elementary stream is supplied from the transport stream buffer TB11 to a multiplex buffer MB14 to be buffered in the multiplex buffer MB14. The video elementary stream is thereafter supplied to an elementary stream buffer EB15 to be buffered in the elementary stream buffer EB15, and then decoded by a decoder D16. When resulting frames of the video data are not arranged in indicated order, a reordering buffer O17 interchanges the frames into the indicated order, and outputs the frames. When the resulting frames of the video data are arranged in the indicated order, the video data is outputted as it is.

An audio elementary stream is supplied from a transport stream buffer TBn2 to a main buffer Bn8 to be buffered in the main buffer Bn8, and then decoded and outputted by a decoder Dn9. System data is supplied from the transport stream buffer TBsys3 to a main buffer Bsys10 to be buffered in the main buffer Bsys10, and then decoded and outputted by a decoder Dsys11.

A rate of transfer Rx1 of the video elementary stream from the transport stream buffer TB11 to the multiplex buffer MB14 is expressed by the following equation (1):

$$Rx1 = 1.2 \times R\text{max}[\text{profile,level}] \tag{1}$$

where Rmax[profile, level] is a parameter defined in ISO/IEC13818-2 and indicating an upper limit value of the transfer rate dependent on the profile and level of each video elementary stream.

Size MBS1 of the multiplex buffer MB14 at low level and main level is expressed by the following equation (2), whereas the size MBS1 of the multiplex buffer MB14 at high-1440 level and high level is represented by the following equation (3):

$$MBS1 = BSmux + BSoh + VBV\text{max}[\text{profile,level}]vb\text{-}v\_\text{buffer\_size} \tag{2}$$

$$MBS1 = BSmux + BSoh \tag{3}$$

where BSoh is size of a virtual overhead buffer Soh (not shown in the figure) for buffering PES (Packetized Elementary Stream) packet overhead, and is defined by the following equation (4); and BSmux is size of an additional multiplex buffer Smux (not shown in the figure), and is defined by the following equation (5).

$$BSoh = (1/750) \times R\text{max}[\text{profile,level}] \tag{4}$$

$$BSmux = 0.04 \times R\text{max}[\text{profile,level}] \tag{5}$$

Also, VBVmax[profile, level] is a parameter defined in ISO/IEC13818-2 and indicating a maximum value of size of a virtual VBV (Video Buffering Verifier) buffer (not shown in the figure), and vbv_buffer_size is included for transmission in a sequence header of a video elementary stream.

Size MBSn of a multiplex buffer MBn under parameters limited in an ISO/IEC11172-2 bit stream is expressed by the following equation (6).

$$MBSn = BSmux + BSoh + vbv\_\text{max} + vbv\_\text{buffer\_size} \tag{6}$$

BSoh and BSmux in the equation (6) are represented by the following equations (7) and (8).

$$BSoh = (1/750) \times R\text{max} \tag{7}$$

$$BSmux = 0.004 \times R\text{max} \tag{8}$$

Rmax in the equations (7) and (8) and vbv_max in the equation (6) designate a maximum bit rate and maximum vbv_buffer_size defined in ISO/IEC11172-2, respectively.

The size of BSmux included in MBS1 is allocated to perform multiplexing through buffering operation. A buffer size remaining after the size allocation to BSmux can be used for BSoh and can also be used for initial multiplexing.

Methods of transferring a video elementary stream from the multiplex buffer MB14 to the elementary stream buffer EB15 include a leak method and a vbv_delay method.

Transfer rate Rbx1 in the leak method is expressed by an equation (9) at low level and main level and represented by an equation (10) at high-1440 level and high level, whereas transfer rate Rbx1 of a parameter bit stream limited by ISO/IEC11172-2 is expressed by an equation (11):

$$Rbx1 = R\text{max}[\text{profile, level}] \tag{9}$$

$$Rbx1 = \text{Min}\{1.05 \times Res, R\text{max}[\text{profile,level}]\} \tag{10}$$

$$Rbx1 = 1.2R\text{max} \tag{11}$$

where Res is transfer bit rate of the elementary stream, and Rmax is maximum bit rate of the bit stream limited by ISO/IEC11172-2.

In transferring data from the multiplex buffer MB14 to the elementary stream buffer EB15 by the leak method, when a PES packet payload is present in the multiplex buffer MB14 and the elementary stream buffer EB15 is not full, the PES packet payload is transferred from the multiplex buffer MB14 to the elementary stream buffer EB15 at a transmission rate of Rbx1. When the elementary stream buffer EB15 is full, the data is not removed from the multiplex buffer MB14. When a data byte is transferred from the multiplex buffer MB14 to the elementary stream buffer EB15, every PES packet header in the multiplex buffer MB14 immediately preceding the data byte is immediately removed and discarded. The data is not removed from the multiplex buffer MB14 when PES packet payload data is not present in the multiplex buffer MB14.

According to the vbv_delay method, on the other hand, vbv_delay coded and included in a video elementary stream precisely defines timing for transmitting coded video data from the multiplex buffer MB14 to the elementary stream buffer EB15. When the vbv_delay method is applied, the last byte of a picture start code of a picture j is transferred from the multiplex buffer MB14 to the elementary stream buffer EB15 at a time tdn(j)–vbv_delay(j), where tdn(j) is a time of decoding the picture j, and vbv_delay(j) is a delay time in seconds indicated in a vbv_delay field of the picture j.

Data bytes between the last bytes of consecutive picture start codes (including the last byte of the second start code) are fragmentarily transferred to the elementary stream buffer EB15 at a fixed trans-mission rate Rbx(j). The transmission rate Rbx(j) is defined for each picture j. The rate of transfer Rbx(j) of the data bytes to the elementary stream buffer EB15 is given by the following equation (12):

$$Rbx(j)=NB(j)/(vbv\_delay(j)\ vbv\_delay(j+1)\ +tdn(j+1)\ tdn(j)) \quad (12)$$

where NB(J) is the number of data bytes between the last bytes of picture start codes of pictures j and J+1 (including the last byte of the second start code and excluding PES packet header bytes).

When data is transferred by the leak method, the multiplex buffer MB14 must not overflow, and must be emptied at least once a second.

When data is transferred by the vbv_delay method, the multiplex buffer MB14 must not overflow or underflow, and the elementary stream buffer EB15 must not overflow.

Next, transfer of audio data and system data will be described. The rate of transfer Rxa of an audio data stream from the transport stream buffer TBn2 to the main buffer Bn8 is expressed by the following equation (13), whereas the rate of transfer Rxsys of system data from the transport stream buffer TBsys3 to the main buffer Bsys10 is expressed by the following equation (14).

$$Rxa=2\times10^6\ (bps) \quad (13)$$

$$Rxsys=1\times10^6\ (bps) \quad (14)$$

Buffer size BSn of the main buffer Bn8 for buffering the audio data is represented by the following equation (15):

$$BSn=BSmux+BSdec+BSoh=3584\ (bytes) \quad (15)$$

where BSdec is size of a virtual access unit decoding buffer (not shown in the figure), and BSoh is size of a virtual PES packet overhead buffer (not shown in the figure). These are conditioned by the following equation (16).

$$BSdec+BSoh\leq2848\ (bytes) \quad (16)$$

Buffer size BSsys of the main buffer Bsys10 for buffering the system data is represented by the following equation (17).

$$BSsys=1536\ (bytes) \quad (17)$$

An access unit An(j) that has been present in the elementary stream buffer EB15 or the main buffer Bn8 longest of all access units buffered therein (a video access unit corresponds to a picture and an audio access unit corresponds to an audio frame) and every stuffing byte preceding the access unit An(j) at a time tdn(j) (the stuffing byte will be described later with reference to FIG. 2) are instantly removed at the time tdn(j). The time tdn(j) is defined in a DTS (Decoding Time Stamp) or PTS (Presentation Time Stamp) field.

In the case of system data, when even a single byte of data is buffered in the main buffer Bsys10, the data in the main buffer Bsys10 is removed at all times at a transport rate of Rbsys expressed by an equation (18).

$$Rbsys=\max\{80000,\ transport\_rate(i)\times8/500\} \quad (18)$$

A PES (Packetized Elementary Stream) packet is divided for transfer into fixed-length transport packets of 188 bytes (hereinafter referred to as TS packets) so that a decoder supplied with the PES packet may separate and decode the inputted multiplexed data by using the T-STD model described above. FIG. 2 shows structure of a TS packet.

The TS packet comprises a 4-byte header describing information for identifying contents of packet data, and a payload describing video, audio, and other data. Structure of the header will be described in the following.

A synchronizing byte is an 8-bit synchronizing signal, serving as data for the decoder to detect the head of the TS packet. A transport error indicator is a 1-bit flag indicating presence or absence of a bit error in the packet. A payload unit start indicator is a 1-bit flag indicating whether the payload of the TS packet contains the head portion of the PES packet or not.

A transport priority indicates priority among a plurality of TS packets having the same PID (Packet Identification). Specifically, among the packets having the same PID, a TS packet with "1" described in the transport priority has priority over a TS packet with "0" described in the transport priority.

A PID is 13-bit stream identifying information indicating the attribute of data described in the payload. For example, 0×0000 described in the PID indicates that information described in the payload is a program association table. The program association table describes the PID of the TS packet describing a program map table, in which the identification number of a program, a PID list of TS packets describing individual video, audio, and other streams and the like are described.

Transport scrambling control describes information on scrambling, that is, information of either no scramble, an Even key, or an Odd key. Adaptation field control indicates presence or absence of an adaptation field and a payload of the TS packet. A continuity counter is 4-bit count information for detecting whether part of the TS packets having the same PID were discarded along the way or not.

An adaptation field describes additional information on the individual information, and a stuffing byte (invalid data byte) for fixing the length of the TS packet is added to the adaptation field. In order to divide a PES packet into fixed-length TS packets, a stuffing byte needs to be added as required, and therefore the length of the adaptation table differs depending on the stuffing byte.

Adaptation field length is 8-bit information indicating a length of the adaptation field. A discontinuity indicator indicates whether there is continuity between the packet and a next packet having the same PID, or whether the system clock is reset or not. A random access indicator indicates a random access entry point, that is, a sequence header of video data or a starting point of a frame of audio data. An elementary stream priority indicator indicates whether the TS packet has the most important part of the TS packets having the same PID (for example an intra-coded slice in video data).

Five-flag data comprises five flags: a PCR flag indicating whether the adaptation field includes PCR (Program Clock Reference) (when the PCR flag is 1, PCR is present); an OPCR flag indicating whether the adaptation field includes OPCR (Original Program Clock Reference) (an OPCR flag of 1 indicates presence of OPCR); a splicing point flag indicating whether the adaptation field includes a splice countdown region (a splicing point flag of 1 indicates presence of a splice countdown region); a transport private data flag indicating whether the adaptation field includes a private data byte (a transport private data flag of 1 indicates presence of a private data byte); and an adaptation field extension flag indicating presence or absence of an extension field of the adaptation field (an adaptation field extension flag of 1 indicates presence of an extension field).

An optional table describes information specified in the five flags. PCR and OPCR each comprise two parts, that is, a base and an extension part, and serve as information for correcting or setting an STC (System Time Clock) serving as time reference in the decoder to a value intended by the decoder. A splice countdown indicates the number of TS packets having the same PID that remain to a splice point (a point indicating a break in data that can be spliced and edited). This enables change of data (for example change between programs and commercials) at compressed stream level. Transport private data length indicates a length of succeeding transport private data. Transport private data is not specified in ISO/IEC standards. Adaptation field extension length indicates a length of an extension field succeeding this area.

Three-flag data comprises three flags: an ltw flag indicating whether the extension field includes an ltw (legal time window) offset area or not; a piecewise rate flag indicating whether the extension field includes a piecewise rate or not; and a seamless splice flag indicating whether the extension field includes a splice type and DTS_next_au (decoding time stamp next access unit) or not.

The extension field describes information specified in the three flags. An ltw_valid flag is a 1-bit flag indicating whether the value of ltw_offset to be described below is valid or not. The value of ltw_offset is defined when the ltw_valid flag is 1, and indicates a reciprocal number of the offset value. A piecewise rate is a value defined when a piecewise flag is 1, and is a virtual bit rate of a TS packet having the same PID and succeeding this TS packet. A splice type is 4-bit data indicating a maximum value of splice rate and a splice decoding delay value. The value of DTS_next_au indicates decoding time of a first access unit after the splicing point.

In order to comply with the ISO/IEC13818-1 requirements mentioned above, a conventional multiplexer simulates data occupancy rate of each buffer in the T-STD model, and then generates a multiplexed stream such that the buffer will not overflow (or underflow). However, since the T-STD model has many defined items as described with reference to FIG. 1, and the buffers are provided in multiple stages, it is not easy to perform simulation for the T-STD model.

SUMMARY OF THE INVENTION

The present invention has been made in view of the above problems. According to the present invention, a multiplexing cycle is derived from a rate of transfer of data between buffers in the T-STD model, and then data is multiplexed by using the cycle, so that in simulation for the T-STD model in multiplexing data, the T-STD model can be considered a model that requires consideration of only one buffer, or a model that does not require any consideration of buffers. Thus, the present invention is intended to reduce the amount of calculation necessary for multiplexing operation, and readily generate a multiplexed transport stream conforming to the ISO/IEC13818-1 requirements.

According to the present invention, there is provided a data multiplexer comprising an extracting means for extracting information necessary for multiplexing processing from a bit stream; a first calculating means for calculating a time division multiplexing cycle such that a separator may separate multiplexed data by a specified method on the basis of information extracted by the extracting means; and a multiplexing means for performing time division multiplexing of the bit stream on the basis of a result calculated by the first calculating means.

The data multiplexer may further include a second calculating means for calculating data occupancy rate of a virtual data buffer of the separator, and the multiplexing means may determine the order of multiplexing bit streams on the basis of the data occupancy rate of the virtual data buffer calculated by the second calculating means.

According to the present invention, there is provided a data multiplexing method comprising an extracting step for extracting information necessary for multiplexing processing from a bit stream; a calculating step for calculating a time division multiplexing cycle such that a separator may separate multiplexed data by a specified method on the basis of information extracted by processing at the extracting step; and a multiplexing step for performing time division multiplexing of the bit stream on the basis of a result calculated by processing at the calculating step.

According to the present invention, there is provided a program recorded on a recording medium, comprising an extracting step for extracting information necessary for multiplexing processing from a bit stream; a calculating step for calculating a time division multiplexing cycle such that a separator may separate multiplexed data by a specified method on the basis of information extracted by processing at the extracting step; and a multiplexing step for performing time division multiplexing of the bit stream on the basis of a result calculated by processing at the calculating step.

The data multiplexer, the data multiplexing method, and the program recorded on a recording medium according to the present invention extract information necessary for multiplexing processing from a bit stream, then calculate a time division multiplexing cycle such that a separator can separate multiplexed data by a specified method on the basis of the extracted information, and performs time division multiplexing of the bit stream on the basis of a result of the calculation.

DESCRIPTION OF THE PREFERRED EMBODIMENT

Preferred embodiments of the present invention will hereinafter be described with reference to the drawings.

Figure 3A:
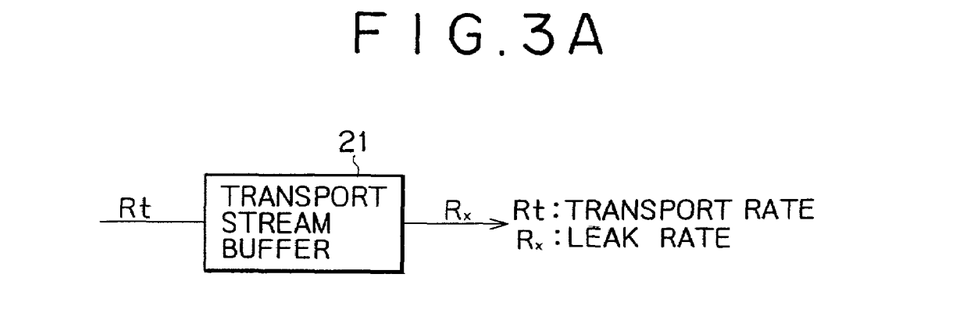
FIGS. 3A, 3B, and 3C are diagrams of assistance in explaining a relation between transport rate, leak rate, and buffer occupancy rate of a transport stream buffer.

As shown in FIG. 3A, let Rt be a transport rate at which data is inputted to a transport stream buffer 21 (the transport stream buffer 21 corresponds to either the transport stream buffer TB11 or the transport stream buffer TBsys3 shown in FIG. 1), and Rx be a leak rate at which data is transferred from the transport stream buffer 21.

Figure 3B:
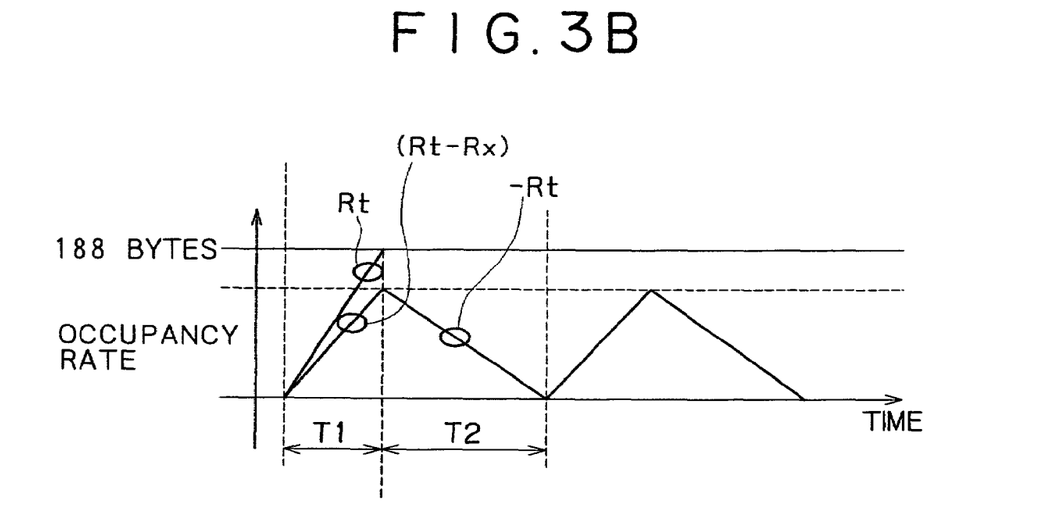

FIG. 3B shows a buffer occupancy rate of the transport stream buffer 21 when one TS packet is transferred to the empty transport stream buffer 21. The following relations expressed by equations (19) and (20) hold between a time Ti during which the amount of data of the transport stream buffer 21 increases, a time T2 during which the amount of data of the transport stream buffer 21 decreases, the transport rate Rt, and the leak rate Rx.

$$(Rt-Rx) \times T1 = Rx \times T2 \quad (19)$$

$$T1 = (188 \times 8)/Rt \quad (20)$$

From the equations (19) and (20), a time T from the start of data input into the transport stream buffer 21 to completion of leak of all the data is expressed by the following equation (21).

$$T = T1 + T2 = (188 \times 8)/Rx \quad (21)$$

It is understood from the equation (21) that the time T is not dependent on the transport rate Rt, and is in inverse proportion to the leak rate Rx.

Figure 3C:
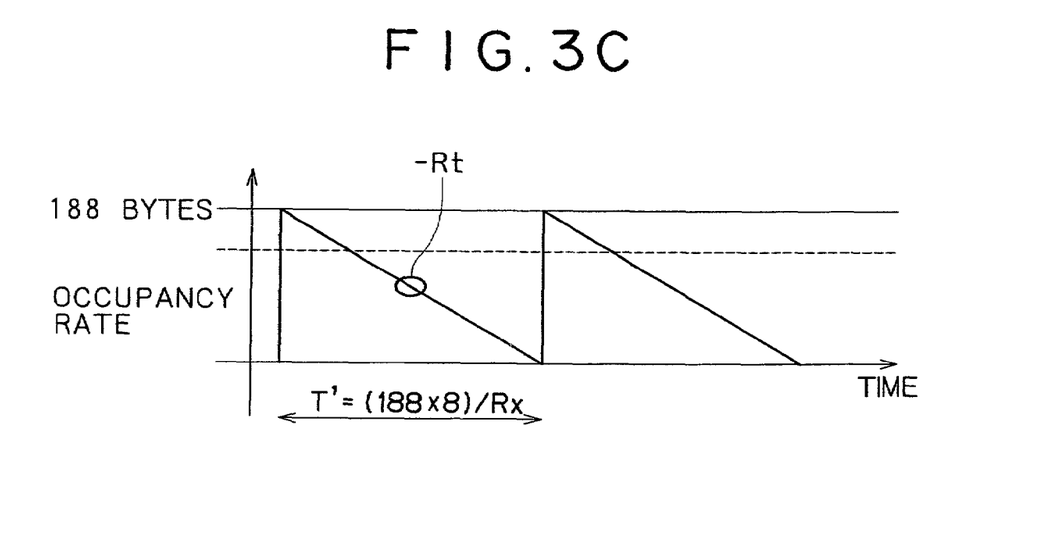

This means that the time T required to transfer one TS packet to the empty transport stream buffer 21 can be considered equivalent to a time T' required to leak 188-byte data at the leak rate Rx, as shown in FIG. 3C. Therefore, transfer of a TS packet in a cycle of the time T' prevents overflow and also ensures that the transport stream buffer 21 becomes empty at least once a second. Thus, in the simulation for the T-STD model, simulation for the transport stream buffer 21 is not required and thereby it may be assumed that the transport stream buffer 21 does not exist.

Consideration will next be given to each stream. First, the leak rate Rxa of an audio elementary stream from the transport stream buffer TBn2 to the main buffer Bn8 is defined as $2 \times 10^6$, as expressed by the equation (13). Hence, a multiplexing cycle Ca of audio elementary stream data is expressed by the following equation (22) by substituting $Rxa = 2 \times 10^6$ into the equation (21).

$$Ca = 188 \times 8/(2 \times 10^6) = 752 \text{ (µsec)} \quad (22)$$

While the leak rate Rxsys of system data from the transport stream buffer TBsys3 to the main buffer Bsys10 is defined as $1 \times 10^6$, as expressed by the equation (14), the leak rate Rbsys from the main buffer Bsys10 is defined as expressed by the equation (18), whereby Rxsys<Rbsys. This indicates that TS packet multiplexing in accordance with a cycle Csys obtained on the basis of Rbsys makes it possible to assume that the transport stream buffer Tbsys3 does not exist in the simulation for the T-STD model, and also to assume that the main buffer Bsys does not exist because it is ensured that the maximum rate of input to the main buffer Bsys10 is Rxsys. A cycle Csys of multiplexing system data is expressed by the following equation (23) by substituting the equation (18) into the equation (21).

$$Csys = 188 \times 8/\max\{80000, transport\_rate(i) \times 8/500\} \quad (23)$$

There are two methods of leaking a video elementary stream from the multiplex buffer MB14, and therefore consideration will be given to each of the two cases.

In the case of the leak method, the rate of transfer from the multiplex buffer MB14 to the elementary stream buffer EB15 is Rbx1 defined by the equations (9) to (11). Hence, TS packet multiplexing in accordance with a cycle Cv represented by the following equation (24) ensures that the maximum rate of input to the elementary stream buffer EB15 is Rbx1. It is therefore possible to treat the multiplex buffer MB14 and the elementary stream buffer EB15 as a single buffer.

$$Cv = (188 \times 8)/(Rbx1 + Roh) \quad (24)$$

In this equation, Roh represents a transfer rate when PES overhead is eliminated. Since Roh is absorbed in the multiplex buffer MB14 (PES overhead is eliminated without being transferred to the elementary stream buffer EB15), it is ensured that the multiplex buffer MB14 is emptied at least once a second.

Figure 4:
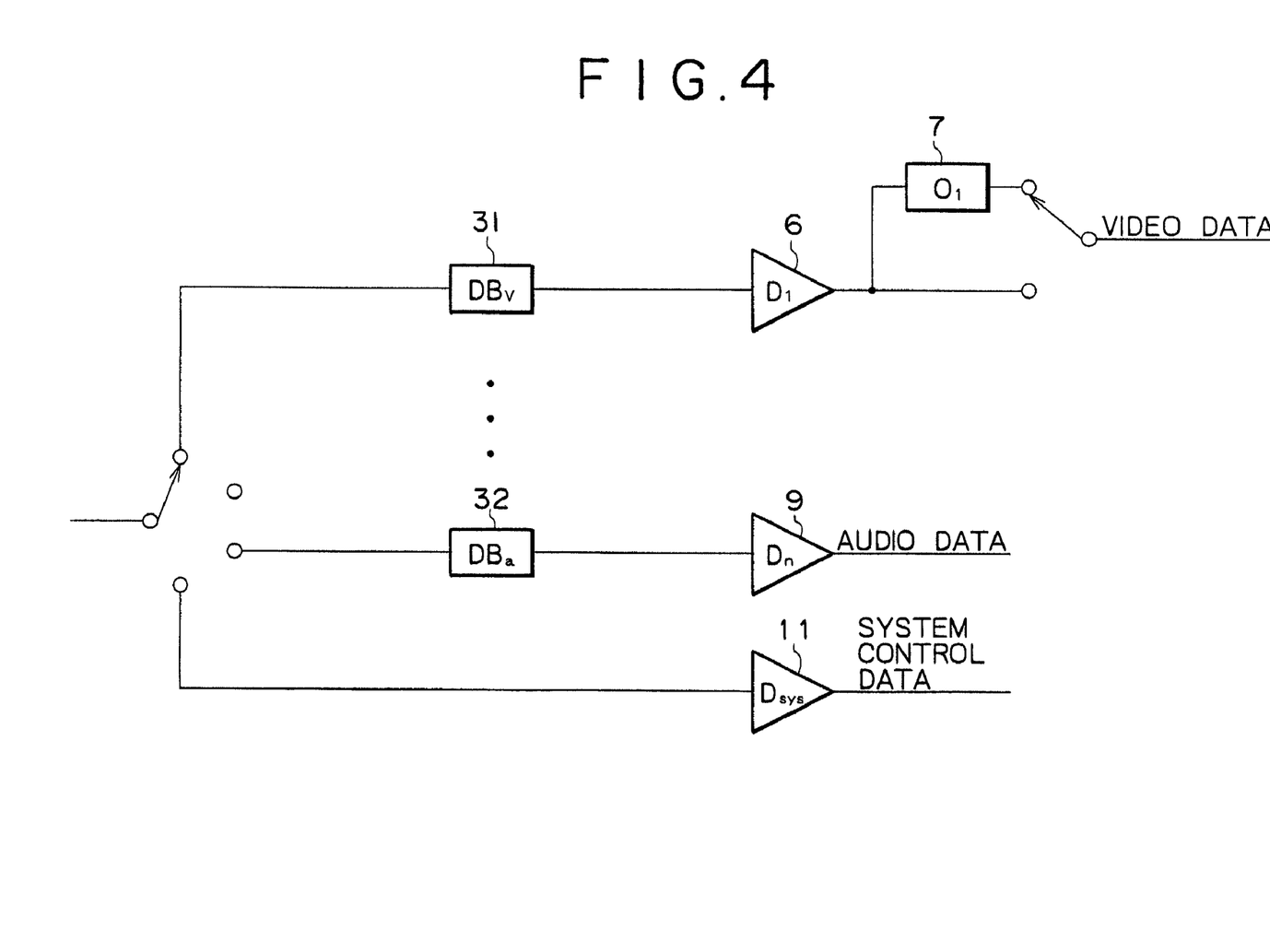
FIG. 4 is a diagram of assistance in explaining a T-STD model simplified under a leak method.

Thus, the T-STD model when a video elementary stream is transferred by the leak method is simplified as shown in FIG. 4. While FIG. 4 shows one video decoder buffer DBv31 and one audio decoder buffer DBa32, the number of video decoder buffers DBv31 and audio decoder buffers DBa32 provided in FIG. 4 coincides with the number of channels of the corresponding elementary streams.

Buffer sizes DBSV and DBSa of the video decoder buffer DBv31 and the audio decoder buffer DBa32 are expressed by the following equations (25) and (26), respectively.

$$DBSV = MBS1 + EBS1 - BSoh \quad (25)$$

$$DBSa = 3584 \quad (26)$$

In the case of the vbv_delay method, on the other hand, the rate of transfer from the multiplex buffer MB14 to the elementary stream buffer EB15 is required to conform to the VBV model specified in ISO/IEC13818-2, and the transfer rate Rbx(j) is given by the equation (12). Hence, TS packet multiplexing may be performed in a variable cycle Cv(j) represented by the following equation (27):

$$Cv(j) = (188 \times 8)/(Rbx(j) + Roh) \quad (27)$$

where Roh is a transfer rate in transferring PES overhead.

TS packet multiplexing in accordance with the cycle Cv(j) means that data transfer to the elementary stream buffer EB15 conforms to the VBV model. Thus, it is ensured that an overflow or an underflow does not occur in the elementary stream buffer EB15, and therefore it is not necessary to take the elementary stream buffer EB15 into consideration in the simulation for the T-STD model. In addition, as in the case of the leak method, since Roh is absorbed in the multiplex buffer MB14, it is not necessary to take the multiplex buffer MB14 into consideration.

Figure 5:
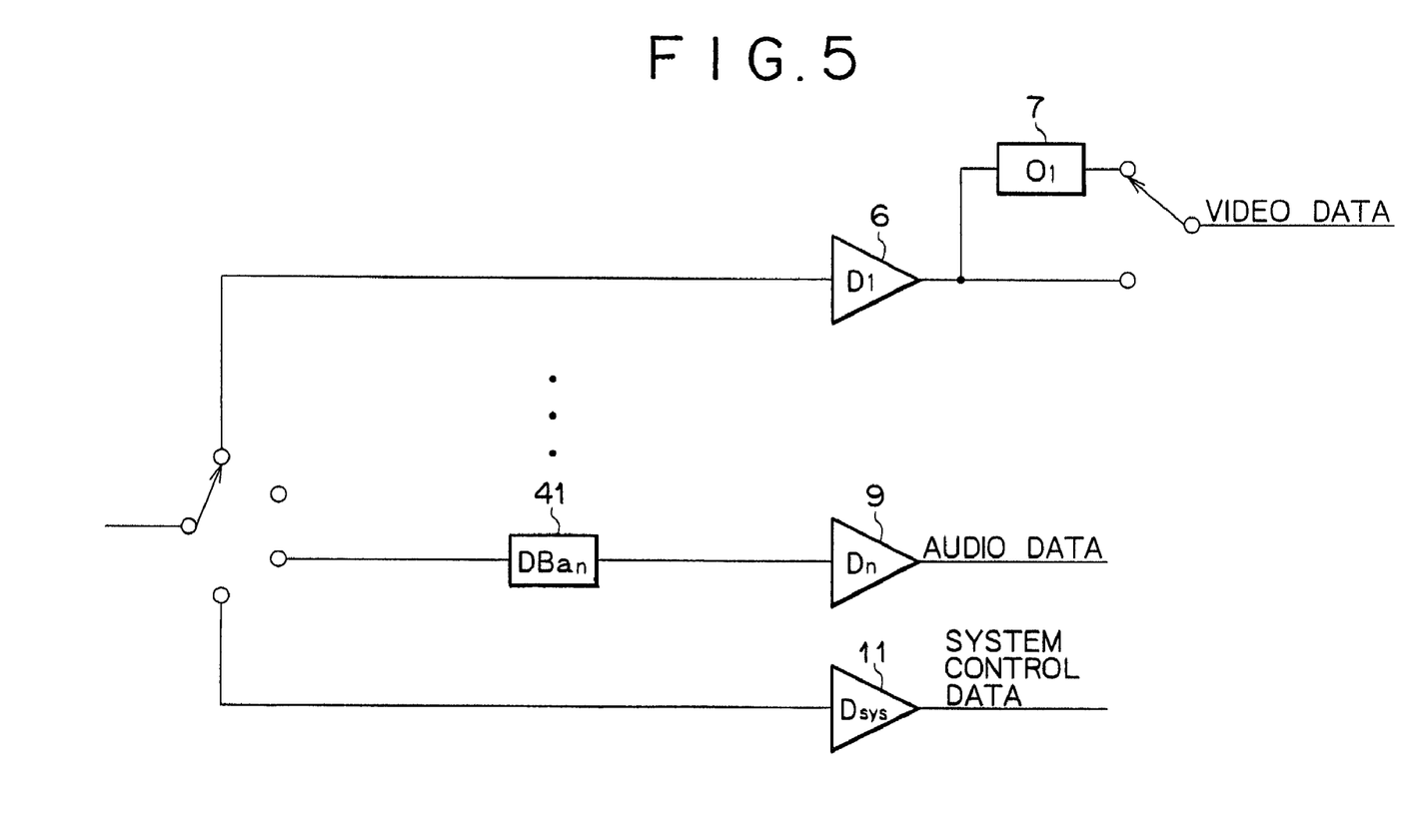
FIG. 5 is a diagram of assistance in explaining a T-STD model simplified under a vbv_delay method.

FIG. 5 shows a T-STD model simplified when a video elementary stream is transferred by the vbv_delay method. It is understood from FIG. 5 that the vbv_delay method requires only simulation for an audio decoder buffer DBan41 for an audio elementary stream. While FIG. 5 shows only one audio decoder buffer DBan41, the number of audio decoder buffers DBa41 provided in FIG. 5 coincides with the number of channels of the audio elementary stream.

Figure 6:
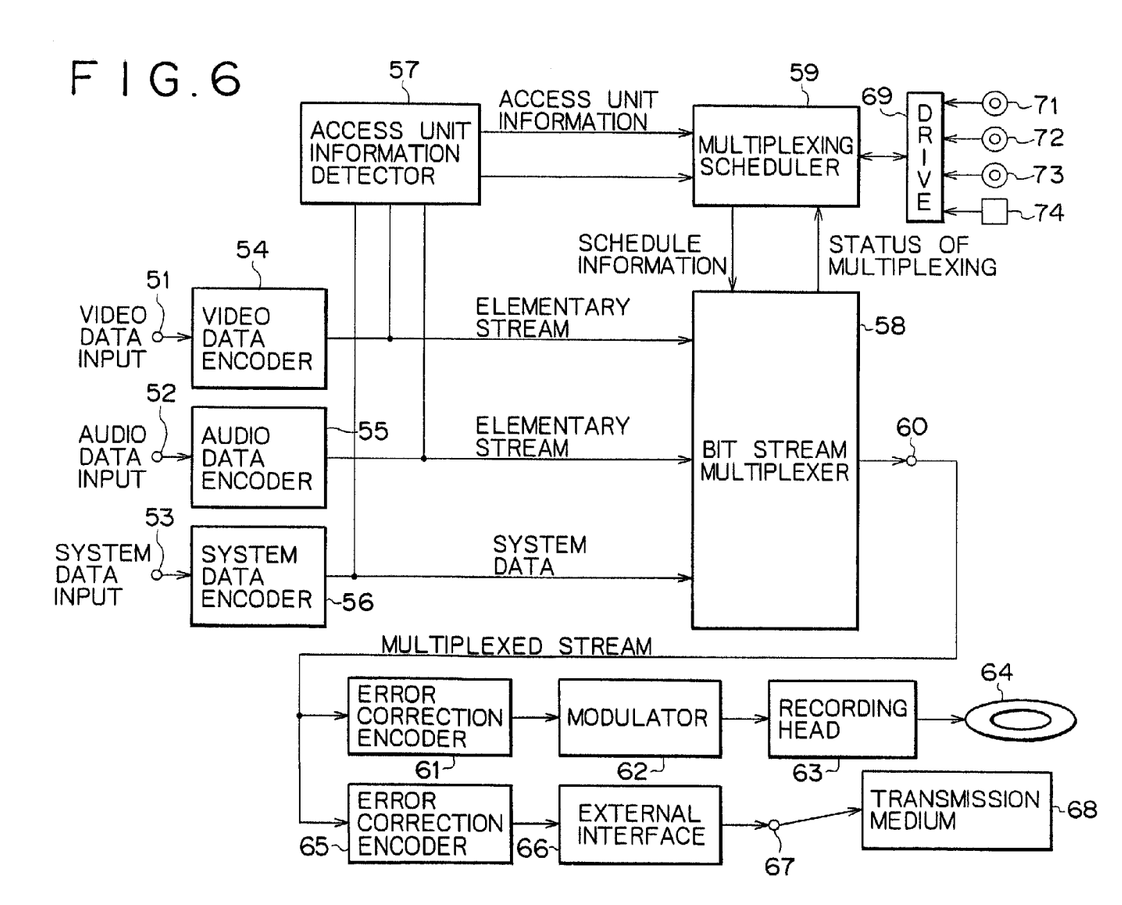
FIG. 6 is a block diagram showing configuration of a first embodiment of a multiplexer according to the present invention.

FIG. 6 is a block diagram showing configuration of a first embodiment of a data multiplexer to which the present invention is applied. A video data encoder 54 compresses and codes a video input signal inputted from a terminal 51 to thereby generate and output a video elementary stream. An audio data encoder 55 compresses and codes an audio input signal inputted from a terminal 52 to thereby generate and output an audio elementary stream. A system data encoder 56 compresses and codes system data inputted from a terminal 53 and thereby outputs the resulting data. While FIG. 6 shows one video data encoder 54, one audio data encoder 55, and one system data encoder 56, a plurality of video data encoders 54 and audio data encoders 55 are provided so that the number of video data encoders 54 and audio data encoders 55 coincides with the number of channels of the corresponding data.

Data outputted from the video data encoder 54, the audio data encoder 55, and the system data encoder 56 is supplied to an access unit information detector 57 and a bit stream multiplexer 58. The access unit information detector 57 extracts access unit information necessary for multiplexing scheduling, such as a picture coding type, access unit length, and decoding time, from the supplied data, and then supplies the access unit information to a multiplexing scheduler 59.

The multiplexing scheduler 59 generates schedule information for multiplexing by using the access unit information supplied from the access unit information detector 57, and then outputs the schedule information to the bit stream multiplexer 58. According to the inputted schedule information, the bit stream multiplexer 58 converts the supplied elementary streams into a multiplexed stream, and then outputs the multiplexed stream to an output terminal 60. Depending on the status of processing of data outputted from the bit stream multiplexer 58, however, the bit stream multiplexer 58 may not be able to directly output the multiplexed stream even when receiving an input of multiplexing schedule information. In such a case, the bit stream multiplexer 58 buffers the elementary streams in an internal buffer not shown in the figure, and also outputs the status of multiplexing to the multiplexing scheduler 59.

The bit stream multiplexer 58 also outputs a result of simulation for the T-STD model (calculation of amount of remaining buffer space), which will be described later with reference to FIGS. 7 and 8, to the multiplexing scheduler 59 as a status of multiplexing. The multiplexing scheduler 59 generates schedule information on the basis of the inputted status of multiplexing, and then outputs the schedule information to the bit stream multiplexer 58.

A drive 69 is connected to the multiplexing scheduler 59, and sends and receives data to and from a magnetic disk 71, an optical disk 72, a magneto-optical disk 73, and a semiconductor memory 74 that are inserted therein as required.

The output terminal 60 is connected to an error correction encoder 61 and an error correction encoder 65. The error correction encoder 61 and the error correction encoder 65 adds an error correction code to the multiplexed stream outputted from the output terminal 60. The error correction encoder 61 supplies the multiplexed stream having the added error correction code to a modulator 62. The modulator 62 subjects the supplied multiplexed stream to specified modulation processing, for example 8-14 modulation or 8-16 modulation, and outputs the result to a recording head 63 to record the modulated multiplexed stream onto a recording medium 64. As the recording medium 64, it is possible to employ magnetic disk media such as an optical disk, a hard disk, or a flexible disk, tape media such as a magnetic tape, and semiconductor recording media such as an IC card and various memory devices. Further, as the optical disk, it is possible to employ various disks such as optical disks and magneto-optical disks where recording is made by physically forming pits, phase change type optical disks, organic dye type optical disks, optical disks where recording is made by ultraviolet laser light, and optical disks having a multilayer recording film.

The error correction encoder 65 outputs the multiplexed stream having the added error correction signal to an external interface 66. The external interface 66 outputs the inputted multiplexed stream to a transmission medium 68, such as a local network and a telephone line, via an output terminal 67. Examples of the transmission medium 68 include not only a wired transmission path in the form of an ordinary cable but also a path of radio transmission by means of radio waves or light.

Referring to a flowchart in FIG. 7, data multiplexing processing in the leak method will next be described.

At a step S1, the multiplexing scheduler 59 initializes multiplexing information required for multiplexing processing such as buffer occupancy rate and time information on the basis of the access unit information supplied from the access unit information detector 57.

The multiplexing scheduler 59 calculates a multiplexing cycle Csys for system data by using the foregoing equation (23) at a step S2, calculates a multiplexing cycle Ca for an audio elementary stream by using the foregoing equation (22) at a step S3, and calculates a multiplexing cycle Cv for a video elementary stream by using the foregoing equation (24) at a step S4.

At a step S5 the multiplexing scheduler 59 determines whether it is proper timing for output of system data, that is, in a case where the system data is to be outputted for a second time or later, determines whether the multiplexing cycle Csys calculated at the step S2 has already passed since the output of previous system data. When the system data is to be outputted for a first time, the multiplexing scheduler 59 determines unconditionally that it is proper timing for output of the system data. When the multiplexing scheduler 59 determines that it is not proper timing for output of the system data at the step S5, the processing proceeds to a step S7.

When the multiplexing scheduler 59 determines that it is proper timing for output of the system data at the step S5, the multiplexing scheduler 59 generates schedule information for multiplexing the system data, and then outputs the schedule information to the bit stream multiplexer 58 at a step S6. The bit stream multiplexer 58 multiplexes the inputted system data and then outputs the result to the output terminal 60. The processing proceeds to a step S7.

At the step S7, the multiplexing scheduler 59 determines whether it is proper timing for output of an audio stream or not, that is, in a case where the audio stream is to be outputted for a second time or later, determines whether the multiplexing cycle Ca calculated at the step S3 has already passed since the output of a previous audio stream or not. When the audio stream is to be outputted for a first time, the multiplexing scheduler 59 determines unconditionally that it is proper timing for output of the audio stream. When the multiplexing scheduler 59 determines that it is not proper timing for output of the audio stream at the step S7, the processing proceeds to a step S10.

When the multiplexing scheduler 59 determines that it is proper timing for output of the audio stream at the step S7, the multiplexing scheduler 59 determines whether the audio decoder buffer DBa32 described with reference to FIG. 4 has free space sufficient to receive a transport stream or not at a step S8. More specifically, when the audio stream is to be outputted for a first time, the audio decoder buffer DBa32 is empty, and therefore the multiplexing scheduler 59 determines that the audio decoder buffer DBa32 has free space sufficient to receive a transport stream. When the audio stream is to be outputted for a second time or later, the multiplexing scheduler 59 determines whether the audio decoder buffer DBa32 has free space sufficient to receive a transport stream or not on the basis of a result of calculation at a step S13, which will be described later. When the multiplexing scheduler 59 determines that the audio decoder buffer DBa32 does not have free space sufficient to receive a transport stream at the step S8, the processing proceeds to the step S10.

When the multiplexing scheduler 59 determines that the audio decoder buffer DBa32 has free space sufficient to receive a transport stream at the step S8, the multiplexing scheduler 59 generates schedule information for multiplexing the audio elementary stream, and then outputs the schedule information to the bit stream multiplexer 58 at a step S9. The bit stream multiplexer 58 multiplexes the inputted audio elementary stream and then outputs the result to the output terminal 60. The processing proceeds to the step S10.

At the step S10, the multiplexing scheduler 59 determines whether it is proper timing for output of a video stream or not, that is, in a case where the video stream is to be outputted for a second time or later, determines whether the multiplexing cycle Cv calculated at the step S4 has already passed or not since a video stream was last outputted. When the video stream is to be outputted for a first time, the multiplexing scheduler 59 determines unconditionally that it is proper timing for output of the video stream. When the multiplexing scheduler 59 determines that it is not proper timing for output of the video stream at the step S10, the processing proceeds to a step S13.

When the multiplexing scheduler 59 determines that it is proper timing for output of the video stream at the step S10, the multiplexing scheduler 59 determines whether the video decoder buffer DBv31 described with reference to FIG. 4 has free space sufficient to receive a transport stream at a step S11. More specifically, when the video stream is to be outputted for a first time, the video decoder buffer DBv31 is empty, and therefore the multiplexing scheduler 59 determines that the video decoder buffer DBv31 has free space sufficient to receive a transport stream. When the video stream is to be outputted for a second time or later, the multiplexing scheduler 59 determines whether the video decoder buffer DBv31 has free space sufficient to receive a transport stream or not on the basis of a result of calculation at a step S14, which will be described later. When the multiplexing scheduler 59 determines that the video decoder buffer DBv31 does not have free space sufficient to receive a transport stream at the step S11, the processing proceeds to the step S13.

When the multiplexing scheduler 59 determines that the video decoder buffer DBv31 has free space sufficient to receive a transport stream at the step S11, the multiplexing scheduler 59 generates schedule information for multiplexing the video elementary stream, and then outputs the schedule information to the bit stream multiplexer 58 at a step S12. The bit stream multiplexer 58 multiplexes the inputted video elementary stream and then outputs the result to the output terminal 60. The processing proceeds to the step S13.

At the step S13, the bit stream multiplexer 58 calculates an amount of remaining available space in the audio decoder buffer DBa32 on the basis of data size of the audio stream multiplexed and outputted at the step S9, and outputs the result of the calculation to the multiplexing scheduler 59.

At the step S14, the bit stream multiplexer 58 calculates an amount of remaining available space in the video decoder buffer DBv31 on the basis of data size of the video stream multiplexed and outputted at the step S12, and outputs the result of the calculation to the multiplexing scheduler 59.

At a step S15, the multiplexing scheduler 59 determines whether data multiplexing has been completed or not on the basis of access unit information supplied from the access unit information detector 57. When the multiplexing scheduler 59 determines that data multiplexing has not been completed at the step S15, the processing returns to the step S5 to repeat processing from the step S5 on down. When the multiplexing scheduler 59 determines that data multiplexing has been completed at the step S15, the processing is ended.

Referring to a flowchart in FIG. 8, data multiplexing processing in the vbv_delay method will next be described.

Figure 7:
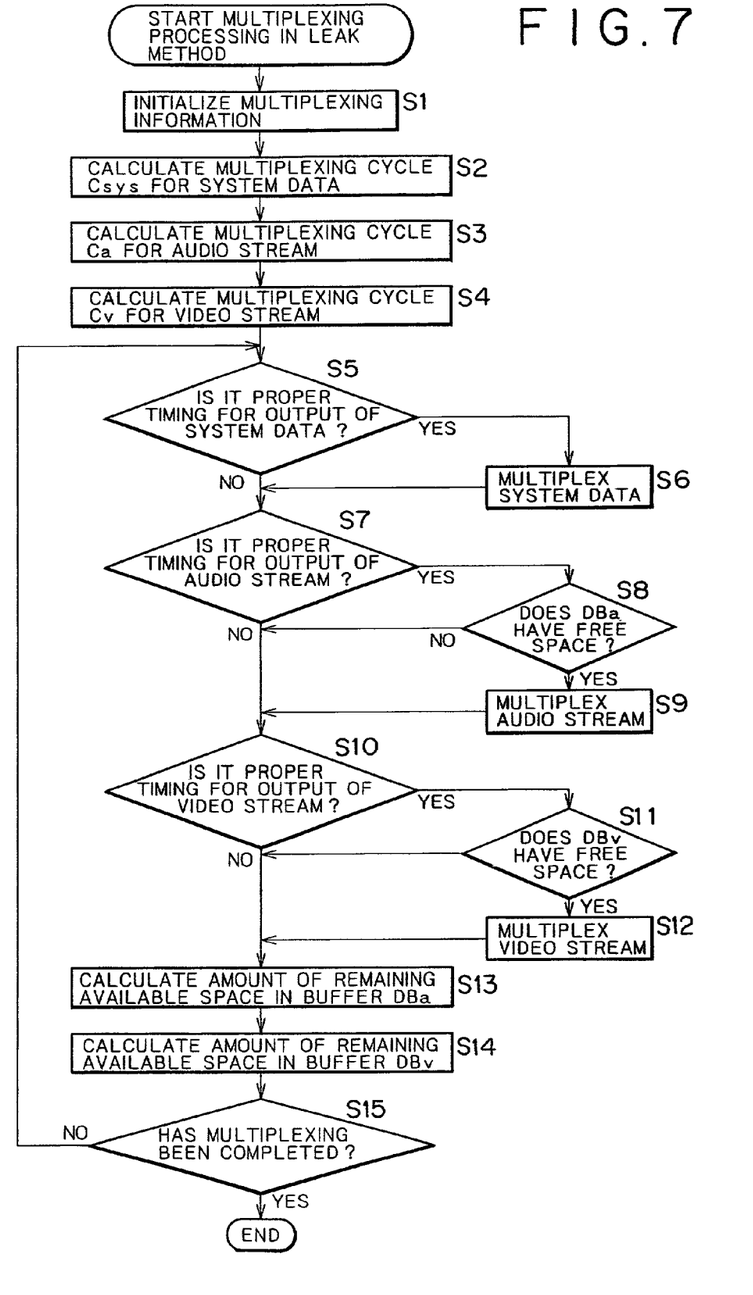
FIG. 7 is a flowchart of assistance in explaining multiplexing processing in the leak method.
Figure 8:
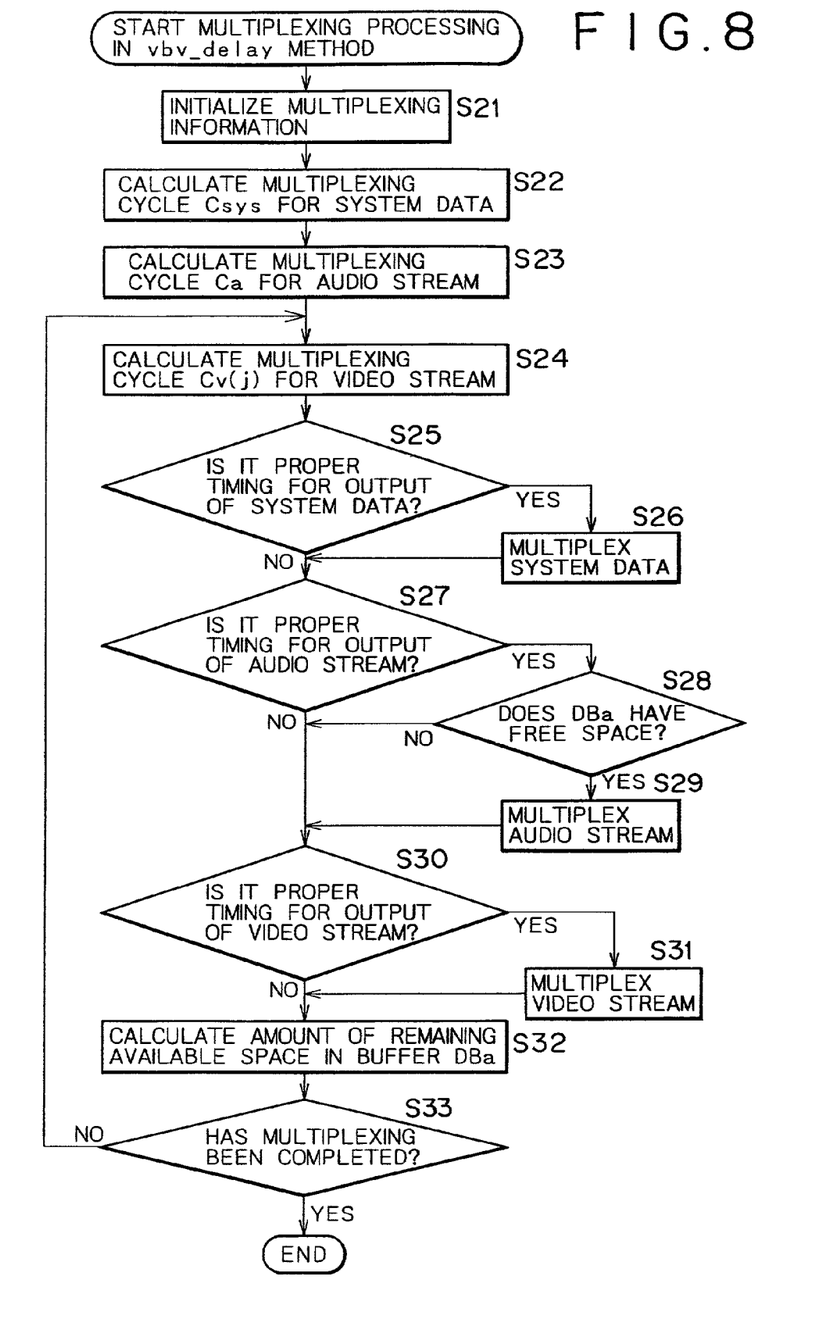
FIG. 8 is a flowchart of assistance in explaining multiplexing processing in the vbv_delay method.

At steps S21 to S23, the same processing as in the steps S1 to S3 in FIG. 7 is carried out. At a step S24, the multiplexing scheduler 59 calculates a multiplexing cycle Cv(j) for a video elementary stream by using the foregoing equation (27).

At steps S25 to S29, the same processing as in the steps S5 to S9 in FIG. 7 is carried out.

At a step S30, the multiplexing scheduler 59 determines whether it is proper timing for output of a video stream or not, that is, in a case where the video stream is to be outputted for a second time or later, determines whether the multiplexing cycle Cv(j) calculated at the step S24 has already passed or not since a video stream was last outputted. When the video stream is to be outputted for a first time, the multiplexing scheduler 59 determines unconditionally that it is proper timing for output of the video stream. When the multiplexing scheduler 59 determines that it is not proper timing for output of the video stream at the step S30, the processing proceeds to a step S32.

When the multiplexing scheduler 59 determines that it is proper timing for output of the video stream at the step S30, the same processing as in the step S12 in FIG. 7 is carried out at a step S31. Then, at the step S32, the same processing as in the step S13 in FIG. 7 is carried out.

At a step S33, the multiplexing scheduler 59 determines whether data multiplexing has been completed or not on the basis of access unit information supplied from the access unit information detector 57. When the multiplexing scheduler 59 determines that data multiplexing has not been completed at the step S33, the processing returns to the step S24 to repeat processing from the step S24 on down. When the multiplexing scheduler 59 determines that data multiplexing has been completed at the step S33, the processing is ended.

Thus, as is understood from comparison of the multiplexing processing in the vbv_delay method described with reference to FIG. 8 with that of the leak method described with reference to FIG. 7, since the multiplexing cycle Cv(j) of the video stream is a variable cycle, the multiplexing processing in the vbv_delay method requires recalculation of the multiplexing cycle Cv(j) for a next video stream at the step S24 before multiplexing the next video stream when the multiplexing scheduler 59 determines that data multiplexing has not been completed at the step S33. Also, the multiplexing processing in the vbv_delay method obviates the need for processing for a video stream decoder buffer that corresponds to processes at the step S11 and the step S14 in FIG. 7, since it is known in advance that the video elementary stream conforms to the VBV requirements.

It is to be noted that the data multiplexing processing methods described with reference to the flowcharts in FIGS. 7 and 8 determine timing for output of system data, audio data, and video data in that fixed order; however, for higher efficiency in multiplexing, an elementary stream for a buffer having the lowest occupancy rate may be multiplexed first after the multiplexing scheduler 59 determines occupancy rate of each of the buffers in the T-STD model.

Figure 9:
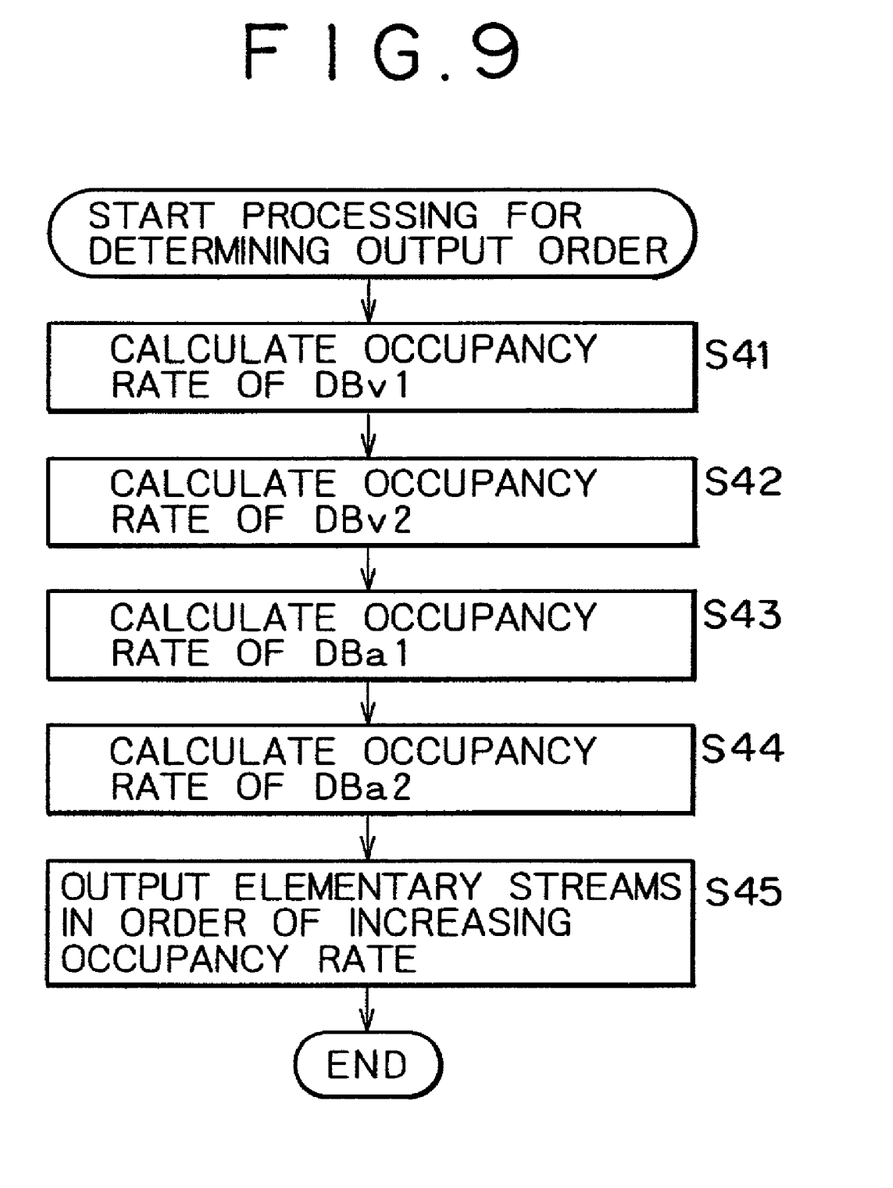
FIG. 9 is a flowchart of assistance in explaining processing for determining output order.

Referring to a flowchart in FIG. 9, description will next be made about processing in the leak method for determining order of output of elementary streams in the case of a two-channel video elementary stream and a two-channel audio elementary stream (that is, in the case of two video decoder buffers DBv31 and two audio decoder buffers DBa32 as described with reference to FIG. 4). In order to differentiate the decoder buffers, description will be made by referring to a 1-ch video decoder buffer DBv as a video decoder buffer DBv1, a 2-ch video decoder buffer DBv as a video decoder buffer DBv2, a 1-ch audio decoder buffer DVa as an audio decoder buffer DVa1, and a 2-ch audio decoder buffer DVa as an audio decoder buffer DVa2.

The multiplexing scheduler 59 calculates buffer occupancy rate of the video decoder buffer DBv1 at a step S41, and calculates buffer occupancy rate of the video decoder buffer DBv2 at a step S42.

The multiplexing scheduler 59 calculates buffer occupancy rate of the audio decoder buffer DVa1 at a step S43, and calculates buffer occupancy rate of the audio decoder buffer DVa2 at a step S44.

At a step S45, on the basis of the occupancy rates of the decoder buffers calculated at the steps S41 to S44, the multiplexing scheduler 59 generates schedule information for outputting elementary streams corresponding to the decoder buffers in the order of increasing occupancy rate, and then outputs the schedule information to the bit stream multiplexer 58. The bit stream multiplexer 58 outputs the elementary streams in the order of increasing buffer occupancy rate according to the inputted schedule information, whereby the processing is ended.

This example for the leak method described above has a 2-ch video elementary stream and a 2-ch audio elementary stream; however, even when the number of channels of the video elementary stream and the audio elementary stream differs and when the vbv_delay method is applied to data transmission, it is possible to perform efficient multiplexing in a similar manner by calculating occupancy rate of each decoder buffer and outputting data streams in the order of increasing buffer occupancy rate.

Figure 10:
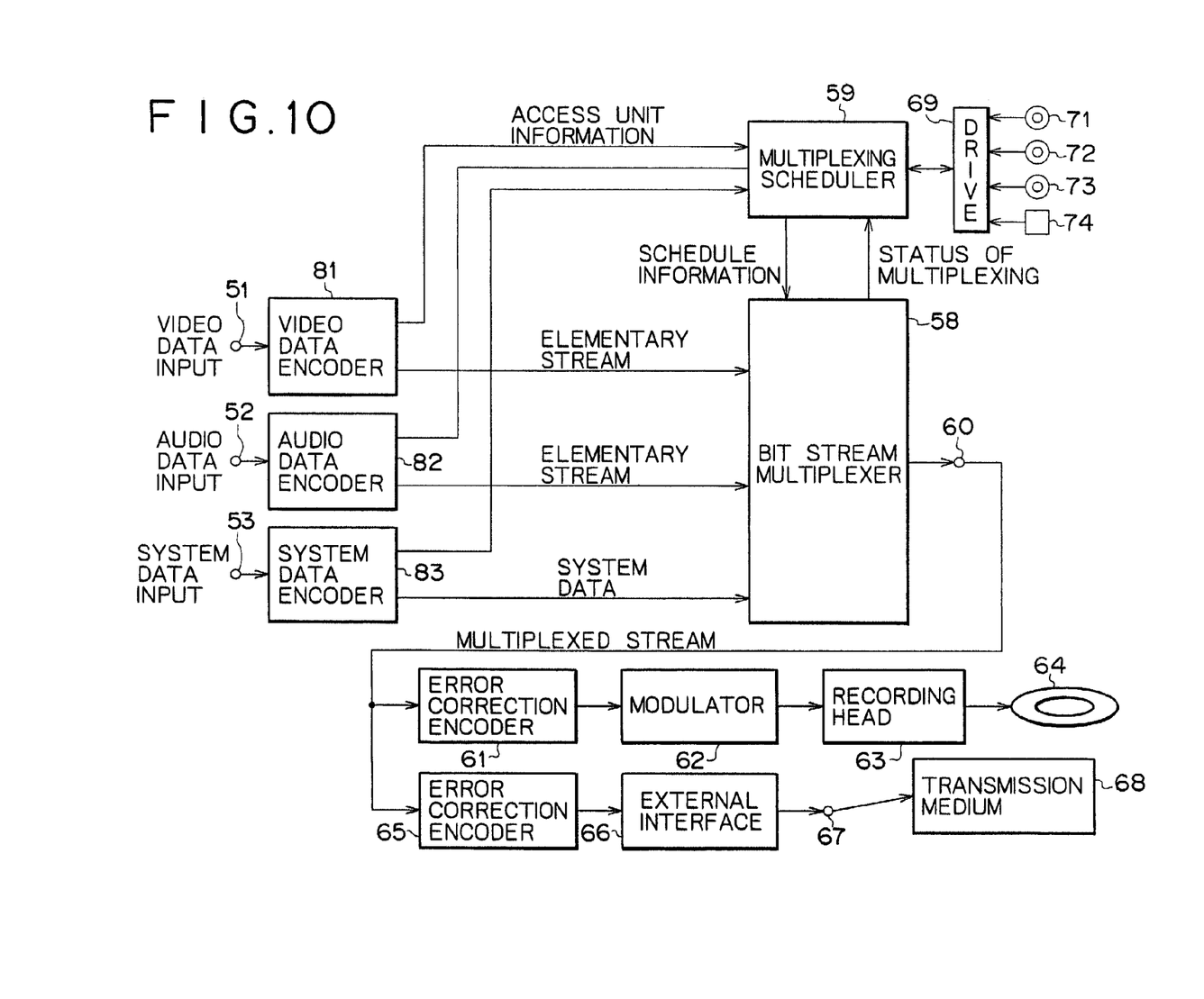
FIG. 10 is a block diagram showing configuration of a second embodiment of a multiplexer according to the present invention.

FIG. 10 is a block diagram showing a second embodiment of a multiplexer according to the present invention. The parts in the multiplexer of FIG. 10 corresponding to those of FIG. 6 are identified by the same reference numerals, and their description will be omitted where not necessary (same for embodiment below). The multiplexer of FIG. 10 basically has the same configuration as that of FIG. 6, except that the multiplexer of FIG. 10 does not have the access unit information detector 57, and is provided with a video data encoder 81, an audio data encoder 82, and a system data encoder 83 having a function of extracting access unit information, rather than the video data encoder 54, the audio data encoder 55, and the system data encoder 56.

The access unit information necessary for multiplexing scheduling, such as a picture coding type, access unit length, and decoding time, which would be detected by the access unit information detector 57 in FIG. 6, is obtained when video data, audio data, and system data are encoded. Thus, the video data encoder 81, the audio data encoder 82, and the system data encoder 83 extract the access unit information, and output the access unit information to a multiplexing scheduler 59.

Figure 11:
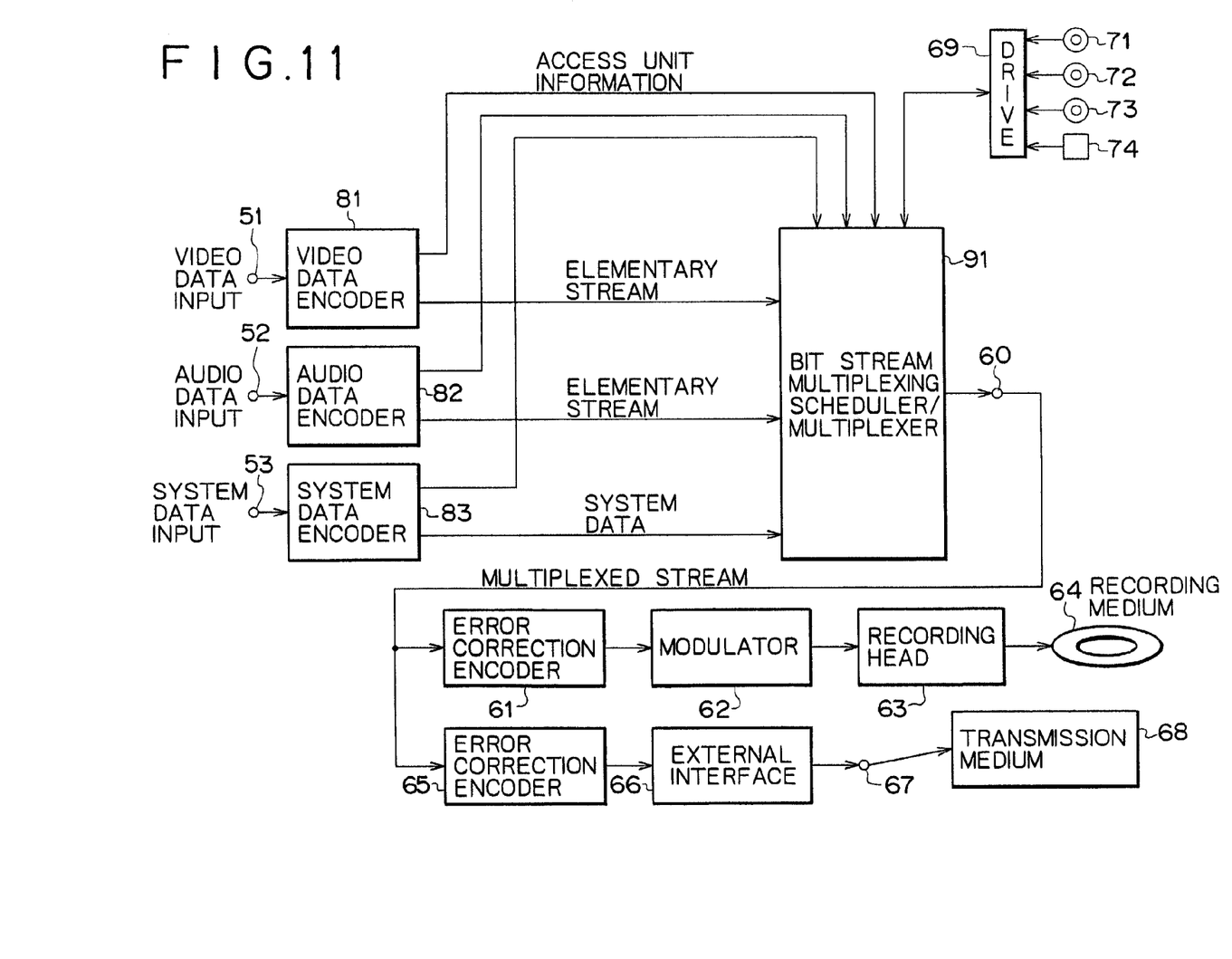
FIG. 11 is a block diagram showing configuration of a third embodiment of a multiplexer according to the present invention.

FIG. 11 is a block diagram showing a third embodiment of a multiplexer according to the present invention. The multiplexer of FIG. 11 basically has the same configuration as that of FIG. 10, except that the multiplexer of FIG. 11 is provided with a bit stream multiplexing scheduler/multiplexer 91 instead of the multiplexing scheduler 59 and the bit stream multiplexer 58, and a drive 69 is connected to the bit stream multiplexing scheduler/multiplexer 91.

The bit stream multiplexing scheduler/multiplexer 91 carries out multiplexing scheduling by using access unit information supplied from a video data encoder 81, an audio data encoder 82, and a system data encoder 83, then multiplexes various data supplied from the video data encoder 81, the audio data encoder 82, and the system data encoder 83 according to the multiplexing schedule, and thereby outputs the result to an output terminal 60.

The series of processing steps described above may be carried out by software. The software is installed from a recording medium onto a computer where programs forming the software are incorporated into dedicated hardware, or a general-purpose personal computer that can perform various functions by installing various programs thereon, for example.

Examples of the recording medium include program-recorded package media distributed to users to provide a program separately from computers, such as magnetic disks 71 (including a floppy disk), optical disks 72 (including CD-ROM (Compact Disk-Read Only Memory) and DVD (Digital Versatile Disk)), magneto-optical disks 73 (including MD (Mini-Disk)), and semiconductor memories 74, as shown in FIGS. 6, 10, and 11.

It is to be noted that in the present specification, the steps of describing a program recorded on a recording medium include not only processes carried out in time series in described order but also processes carried out in parallel or individually and not necessarily in time series.

A data multiplexer, a data multiplexing method, and a program recorded on a recording medium according to the present invention extract information necessary for multiplexing processing from a bit stream, then calculate a time division multiplexing cycle such that a separator can separate multiplexed data by a given method on the basis of the extracted information, and performs time division multiplexing of the bit stream on the basis of a result of the calculation. Therefore, it is possible to reduce the amount of calculation for simulation of data occupancy rate of a virtual data buffer in the T-STD model, and to thereby readily generate a multiplexed transport stream conforming to the ISO/IEC13818-1 requirements.

What is claimed is:

1. A data multiplexing method for a data multiplexer performing time division multiplexing of a plurality of bit streams, said method comprising the steps of:

extracting access unit information necessary for multiplexing processing from each of said plurality of bit streams;

calculating a time division multiplexing cycle for each of said plurality of bit streams, such that a separator separates multiplexed data by a specified method on the basis of said information extracted by processing at said extracting step, wherein the calculating step calculates the time division multiplexing cycle irrespective of the transport rate of said plurality of bit streams, performing time division multiplexing of said plurality of bit streams on the basis of a result calculated by processing at said calculating step; and a second calculating step for calculating a data occupancy rate of a virtual data buffer of said separator, wherein said multiplexing determines an order in which said plurality of bit streams are multiplexed on the basis of the data occupancy rate of said virtual data buffer calculated by the second calculating step.

2. A program for a data multiplexer performing time division multiplexing of a bit stream, which is recorded on a recording medium readable by a computer, said program comprising the steps of:

extracting access unit information necessary for multiplexing processing from each of said plurality of bit streams;

calculating a time division multiplexing cycle for each of said plurality of bit streams, such that a separator separates multiplexed data by a specified method on the basis of said information extracted by processing at said extracting step, wherein the calculating step calculates the time division multiplexing cycle irrespective of the transport rate of said plurality of bit streams, performing time division multiplexing of said plurality of bit streams on the basis of a result calculated by processing at said calculating step; and a second calculating step for calculating a data occupancy rate of a virtual data buffer of said separator, wherein said multiplexing determines an order in which said plurality of bit streams are multiplexed on the basis of the data occupancy rate of said virtual data buffer calculated by the second calculating step.

3. The data multiplexing method as claimed in claim 1, further comprising the steps of:

generating schedule information from a multiplexing scheduler means by using said access unit information.

* * * * *